United States Patent
Chun et al.

(10) Patent No.: US 12,400,633 B2
(45) Date of Patent: Aug. 26, 2025

(54) END-TO-END SPEECH WAVEFORM GENERATION THROUGH DATA DENSITY GRADIENT ESTIMATION

(71) Applicant: Google LLC, Mountain View, CA (US)

(72) Inventors: Byungha Chun, Tokyo (JP); Mohammad Norouzi, Richmond Hill (CA); Nanxin Chen, Baltimore, MD (US); Ron J. Weiss, New York, NY (US); William Chan, Toronto (CA); Yu Zhang, Mountain View, CA (US); Yonghui Wu, Fremont, CA (US)

(73) Assignee: Google LLC, Mountain View, CA (US)

( * ) Notice: Subject to any disclaimer, the term of this patent is extended or adjusted under 35 U.S.C. 154(b) by 288 days.

(21) Appl. No.: 18/010,438

(22) PCT Filed: Sep. 2, 2021

(86) PCT No.: PCT/US2021/048937
§ 371 (c)(1),
(2) Date: Dec. 14, 2022

(87) PCT Pub. No.: WO2022/051552
PCT Pub. Date: Mar. 10, 2022

(65) Prior Publication Data
US 2023/0252974 A1   Aug. 10, 2023

Related U.S. Application Data

(60) Provisional application No. 63/170,401, filed on Apr. 2, 2021, provisional application No. 63/073,867, filed on Sep. 2, 2020.

(51) Int. Cl.
*G10L 13/08*   (2013.01)
*G10L 21/0208*  (2013.01)

(52) U.S. Cl.
CPC .......... *G10L 13/08* (2013.01); *G10L 21/0208* (2013.01)

(58) Field of Classification Search
CPC ........................... G10L 13/08; G10L 21/0208
See application file for complete search history.

(56) References Cited

U.S. PATENT DOCUMENTS

| 5,583,968 A | 12/1996 | Trompf |
| 6,535,617 B1 | 3/2003 | Hannigan et al. |

(Continued)

FOREIGN PATENT DOCUMENTS

| JP | 2019-168608 | 10/2019 |
| JP | 2019-532349 | 11/2019 |

(Continued)

OTHER PUBLICATIONS

Shen et al., "Natural TTS Synthesis by Conditioning WaveNet on Mel Spectrogram Predictions," Presented at International Conference on Acoustics, Speech, and Signal Processing, Calgary, Canada, Apr. 15-20, 2018; CoRR, Submitted on Feb. 16, 2018, arXiv:1712.05884v2, 5 pages (Year: 2018).*

(Continued)

*Primary Examiner* — Pierre Louis Desir
*Assistant Examiner* — Cody Douglas Hutcheson
(74) *Attorney, Agent, or Firm* — Fish & Richardson P.C.

(57) ABSTRACT

Methods, systems, and apparatus, including computer programs encoded on a computer storage medium, for generating waveforms conditioned on phoneme sequences. In one aspect, a method comprises: obtaining a phoneme sequence; processing the phoneme sequence using an encoder neural network to generate a hidden representation of the phoneme sequence; generating, from the hidden representation, a conditioning input; initializing a current waveform output; and generating a final waveform output that defines an (Continued)

utterance of the phoneme sequence by a speaker by updating the current waveform output at each of a plurality of iterations, wherein each iteration corresponds to a respective noise level, and wherein the updating comprises, at each iteration: processing (i) the current waveform output and (ii) the conditioning input using a noise estimation neural network to generate a noise output; and updating the current waveform output using the noise output and the noise level for the iteration.

27 Claims, 7 Drawing Sheets

(56) References Cited

U.S. PATENT DOCUMENTS

| | | | |
|---|---|---|---|
| 10,068,557 B1 * | 9/2018 | Engel | G06N 3/045 |
| 2017/0092268 A1 | 3/2017 | Kristjansson | |
| 2018/0075343 A1 * | 3/2018 | van den Oord | G06F 40/44 |
| 2019/0122651 A1 | 4/2019 | Arik et al. | |
| 2020/0066253 A1 | 2/2020 | Peng et al. | |

FOREIGN PATENT DOCUMENTS

| | | |
|---|---|---|
| WO | WO 2007095277 A2 | 8/2007 |
| WO | WO 2018215344 A1 | 11/2018 |

OTHER PUBLICATIONS

Li et al., "Neural Speech Synthesis with Transformer Network," CoRR, Submitted on Jan. 30, 2019, arXiv:1809.08895v3, 8 pages (Year: 2019).*
Ai et al., "Knowledge-and-Data-Driven Amplitude Spectrum Prediction for Hierarchical Neural Vocoders," CoRR, Submitted on May 18, 2020, arXiv:2004.07832v2, 5 pages.
Ardizzone et al., "Guided Image Generation with Conditional Invertible Neural Networks," CoRR, Submitted on Jul. 10, 2019, arXiv:1907.02392v3, 11 pages.
Biadsy et al., "Parrotron: An End-to-End Speech-to-Speech Conversion Model and its Applications to Hearing-Impaired Speech and Speech Separation," Presented at Interspeech 2019, Graz, Austria, Sep. 15-19, 2019; CoRR, Submitted on Oct. 29, 2019, arXiv:904.04169v3, 5 pages.
Binkowski et al., "High Fidelity Speech Synthesis with Adversarial Networks," Presented at International Conference on Learning Representations, Addis Aababa, Ethiopia, Apr. 26-30, 2020, 15 pages.
Cai et al., "Learning Gradient Fields for Shape Generation," Presented at ECCV 2020, Virtual Conference, Aug. 23-28, 2020; CoRR, Submitted on Aug. 18, 2020, arXiv:2008.06520v2, 33 pages.
Chan et al., "An Empirical Study of Generation Order for Machine Translation," CoRR, Submitted on Oct. 29, 2019, arXiv:1910.13437v1, 10 pages.
Chan et al., "Imputer: Sequence Modelling via Imputation and Dynamic Programming," Presented at International Conference on Learning Representations, Virtual Conference, Jul. 12-18, 2020; CoRR, Submitted on Apr. 22, 2020, arXiv:2002.08926v2, 11 pages.
Chan et al., "Kermit: Generative Insertion-Based Modeling for Sequences," CoRR, Submitted on Jun. 4, 2019, arXiv:1906.01604v1, 11 pages.
Chan et al., "Multilingual Kermit: It's Not Easy Being Generative," Presented at Advances in Neural Information Processing Systems, Vancouver Canada, Dec. 8-14, 2019; Advances in Neural Information Processing Systems 32, Dec. 2019, 8 pages.
Chen et al., "WaveGrad 2: Iterative Refinement for Text-to-Speech Synthesis," CoRR, Submitted on Jun. 17, 2021, arXiv:2106.09660v1, 5 pages.
Chen et al., "WaveGrad: Estimating Gradients for Waveform Generation," CoRR, Submitted on Sep. 2, 2020, arXiv:2009.00713v1, 15 Pages.
Chu et al., "Reducing F0 Frame Error of F0 Tracking Algorithms under Noisy Conditions with an Unvoiced/Voiced Classification Frontend," Presented at 34th International Conference on Acoustics, Speech, and Signal Processing, Taipei, Taiwan, Apr. 19-24, 2009, 4 pages.
Devlin et al., "BERT: Pre-training of Deep Bidirectional Transformers for Language Understanding," Presented at North American Chapter of the Association for Computational Linguistics, Minneapolis MN, Jun. 2-7, 2019; CoRR, Submitted on May 24, 2019, arXiv:1810.04805v2, 16 pages.
Donahue et al., "Adversarial Audio Synthesis," CoRR, arXiv:1802.04208v2, Submitted on Sep. 27, 2018, 15 pages.
Donahue et al., "End-to-End Adversarial Text-To-Speech," Presented at International Conference on Learning Representations, Virtual Conference, May 3-7, 2021; CoRR, Submitted on Mar. 17, 2021, arXiv:2006.03575v3, 23 pages.
Dumoulin et al., "Feature-wise transformations," Distill, Jul. 9, 2018, 3(7):e11, 25 pages.
Engel et al., "DDSP: Differentiable Digital Signal Processing," Presented at International Conference on Learning Representations, Virtual Conference, Apr. 26-30, 2020; CoRR, Submitted on Jan. 14, 2020, arXiv:2001.04643v1, 19 pages.
Engel et al., "GANSynth: Adversarial Neural Audio Synthesis," Presented at International Conference on Learning Representations, New Orleans LA, May 6-9, 2019; CoRR, Submitted on Apr. 15, 2019, arXiv:1902.08710v2, 17 pages.
Ghazvininejad et al., "Mask-Predict: Parallel Decoding of Conditional Masked Language Models," Presented at Conference on Empirical Methods in Natural Language Processing and the 9th International Joint Conference on Natural Language Processing, Hong Kong, China, Nov. 3-7, 2019; CoRR, Submitted on Sep. 4, 2019, arXiv:1904.09324v2, 10 pages.
Gritsenko et al., "A Spectral Energy Distance for Parallel Speech Synthesis," CoRR, Submitted on Oct. 23, 2020, arXiv:2008.01160v2, 19 pages.
Gu et al., "Levenshtein Transformer," Presented at Advances in Neural Information Processing Systems, Vancouver, Canada, Dec. 8-14, 2019; CoRR, Submitted on Oct. 28, 2019, arXiv:1905.11006v2, 17 pages.
He et al., "Deep Residual Learning for Image Recognition," Presented at Conference on Computer Vision and Pattern Recognition, Las Vegas NV, Jun. 27-30, 2016, 12 pages.
Hippocampus et al., "WaveDiff: Denoising diffusion probabilistic vocoder," Cranberry-Lemon University, Department of Computer science, upon information and belief, available no later than Sep. 2, 2020, 13 pages.
Ho et al., "Denoising Diffusion Probabilistic Models," CoRR, Submitted on Dec. 16, 2020, arXiv:2006.11239v2, 25 pages.
Ho et al., "Denoising Diffusion Probabilistic Models," CoRR, Submitted on Jun. 19, 2020, arXiv:2006.11239v1, 24 pages.
Hyvarinen., "Estimation of Non-Normalized Statistical Models by Score Matching," Journal of Machine Learning Research 6, Apr. 5, 2005, 15 pages.
International Preliminary Report on Patentability in International Appln. No. PCT/US2021/048931, mailed on Mar. 16, 2023, 14 pages.
International Preliminary Report on Patentability in International Appln. No. PCT/US2021/048937, mailed on Mar. 16, 2023, 8 pages.
International Search Report and Written Opinion in International Appln. No. PCT/US2021/048931, mailed on Jan. 5, 2022, 17 pages.
International Search Report and Written Opinion in International Appln. No. PCT/US2021/048937, mailed on Nov. 30, 2021, 12 pages.
Ioffe et al., "Batch Normalization: Accelerating Deep Network Training by Reducing Internal Covariate Shift," CoRR, Submitted on Mar. 2, 2015, arXiv:1502.03167v3, 11 pages.

(56) References Cited

OTHER PUBLICATIONS

Jia et al., "Direct Speech-to-Speech Translation with a Sequence-to-Sequence Model," Presented at Interspeech, Graz, Austria, Sep. 15-19, 2019; CoRR, Submitted on Jun. 25, 2019, arXiv:1904.06037v2, 5 pages.

Juvela et al., "Glotnet—a raw waveform model for the glottal excitation in statistical parametric speech synthesis," IEEE/ACM Transactions on Audio, Speech, and Language Processing, Mar. 27, 2019, 27(6):1019-1030.

Kalchbrenner et al., "Efficient Neural Audio Synthesis," Presented on International Conference on Machine Learning, Stockholm, Sweden, Jul. 10-15, 2018: CoRR, Submitted on Jun. 25, 2018, arXiv:1802.08435v2, 10 pages.

Kim et al., "FloWaveNet: A generative flow for raw audio," Presented on International Conference on Machine Learning, Long Beach CA, Jun. 9-15, 2019; CoRR, Submitted on May 20, 2019, arXiv:1811.02155v3, 9 pages.

Kim et al., "WaveNODE: A Continuous Normalizing Flow for Speech Synthesis," Presented at ICML: Workshop on Invertible Neural Networks, Normalizing Flows, and Explicit Likelihood Models, Virtual Conference, Jul. 18, 2020; CoRR, Submitted on Jul. 2, 2020, arXiv:2006.04598v4, 8 pages.

Krueger et al., "Zoneout: Regularizing rnns by randomly preserving hidden activations," Presented at International Conference on Learning Representations, Toulon, France, Apr. 24-26, 2017; CoRR, Submitted on Sep. 22, 2017, arXiv:1606.01305v4, 11 pages.

Kubichek, "Mel-Cepstral Distance Measure for Objective Speech Quality Assessment," IEEE Pacrim, May 19, 1993, 125-128.

Kumar et al., "MelGAN: Generative Adversarial Networks for Conditional Waveform Synthesis," Presented at Advances in Neural Information Processing Systems, Vancouver Canada, Dec. 8-14, 2019; CoRR, Submitted on Dec. 9, 2019, arXiv:1910.06711v3, 14 pages.

Lee et al., "Deterministic Non-Autoregressive Neural Sequence Modeling by Iterative Refinement," Presented at Conference on Empirical Methods in Natural Language Processing, Brussels, Belgium, Oct. 31-Nov. 4, 2018; CoRR, Submitted on Aug. 27, 2018, arXiv:1802.06901v3, 11 pages.

Li et al., "Big Bidirectional Insertion Representations for Documents," CoRR, Submitted on Oct. 29, 2019, arXiv:1910.13034v1, 5 pages.

Li et al., "Neural Speech Synthesis with Transformer Network," CoRR, Submitted on Jan. 30, 2019, arXiv:1809.08895v3, 8 pages.

McCarthy et al., "HooliGAN: Robust, High Quality Neural Vocoding," CoRR, Submitted on Aug. 6, 2020, arXiv:2008.02493v1, 5 pages.

Mehri et al., "SampleRNN: An Unconditional End-to-End Neural Audio Generation Model," Presented at International Conference on Learning Representations, Toulon, France, Apr. 24-26, 2017; CoRR, Submitted on Feb. 11, 2017, arXiv:1612.07837v2, 11 pages.

Mesenguer-Brocal et al., "Conditioned-U-Net: Introducing a Control Mechanism in the U-Net for Multiple Source Separations," CoRR, Submitted on Nov. 21, 2019, arXiv:1907.01277v3, 7 pages.

Notice of Allowance in Korean Appln. No. 10-2022-7045232, mailed on Aug. 30, 2024, 5 pages (with English translation).

Office Action in Indian Application No. 202227076349, mailed on Dec. 8, 2023, 7 pages (with English translation).

Office Action in Indian Application No. 2022-27076350, mailed on Aug. 25, 2023, 5 pages (with English translation).

Office Action in Japanese Application No. 2022-580973, mailed on Dec. 25, 2023, 13 pages (with English translation).

Office Action in Japanese Application No. 2022-580985, mailed on Apr. 1, 2024, 15 pages (with English translation).

Office Action in Korean Application No. 10-2022-7045943, mailed on Feb. 29, 2024, 12 pages (with English translation).

Park et al., "Semantic Image Synthesis with Spatially-Adaptive Normalization," Presented at IEEE Conference on Computer Vision and Pattern Recognition, Long Beach CA, Jun. 16-20, 2019; CoRR, Submitted on Nov. 5, 2019, arXiv:1903.07291v2, 19 pages.

Park et al., "SpecAugment: A simple data augmentation method for automatic speech recognition," CoRR, Submitted on Dec. 3, 2019, arXiv:1904.08779v3, 6 pages.

Peng et al., "Non-Autoregressive Neural Text-to-Speech," Presented at International Conference on Machine Learning, Virtual Conference, Jul. 12-18, 2020; CoRR, Submitted on Jun. 29, 2020, arXiv:1905.08459v3, 13 pages.

Ping et al., "ClariNet: Parallel Wave Generation in End-to-End Text-to-Speech," International Conference on Learning Representations, New Orleans LA, May 6-9, 2019; CoRR, Submitted on Feb. 22, 2019, arXiv:1807.07281v3, 15 pages.

Prenger et al., "Waveglow: A Flow-based Generative Network for Speech Synthesis," CoRR, Submitted on Oct. 31, 2018, arXiv:1811.00002v1, 5 pages.

Ren et al., "Fast and high-quality end-to-end text to speech," CoRR, Submitted on Aug. 8, 2022, arXiv:2006.04558v8, 15 pages.

Ruis et al., "Insertion-Deletion Transformer," Presented at Empirical Methods in Natural Language Processing: Workshop of Neural Generation and Translation, Virtual Conference, Nov. 19-20, 2020; CoRR, Submitted on Jan. 15, 2020, arXiv:2001.05540v1, 5 pages.

Sabour et al., "Optimal Completion Distillation for Sequence Learning," Presented at International Conference on Machine Learning, New Orleans LA, May 6-9, 2019; CoRR, Submitted on Jan. 14, 2019, arXiv:1810.01398v2, 16 pages.

Saharia et al., "Non-Autoregressive Machine Translation with Latent Alignments," CoRR, Submitted on Nov. 16, 2020, arXiv:2004.07437v3, 11 pages.

Salimans et al., "PixelCNN++: Improving the PixelCNN with discretized logistic mixture likelihood and other modifications," Presented at International Conference on Learning Representations, Toulon, France, Apr. 24-26, 2017; CoRR, Submitted on Jan. 29, 2017, arXiv:1701.05517v1, 10 pages.

Saxe et al., "Exact Solutions to the Nonlinear Dynamics of Learning in Deep Linear Neural Networks," Presented at International Conference on Learning Representations, Banff, Canada, Apr. 14-16, 2014; CoRR, Submitted on Feb. 19, 2014, arXiv:1312.6120v3, 22 pages.

Shen et al., "Natural TTS Synthesis by Conditioning WaveNet on Mel Spectrogram Predictions," Presented at International Conference on Acoustics, Speech, and Signal Processing, Clagary, Canada, Apr. 15-20, 2018; CoRR, Submitted on Feb. 16, 2018, arXiv:1712.05884v2, 5 pages.

Shen et al., "Non-attentive Tacotron: Robust and controllable neural TIS synthesis including unsupervised duration modeling," CoRR, Submitted on May 11, 2021, arXiv:2010.04301v4, 14 pages.

Sohl-Dickstein et al., "Deep Unsupervised Learning using Nonequilibrium Thermodynamics," Presented at International Conference on Machine Learning, Lille, France, Jul. 6-11, 2015; CoRR, Submitted on Nov. 18, 2015, arXiv:1503.03585v8, 18 pages.

Song et al., "ExcitNet Vocoder: A Neural Excitation Model for Parametric Speech Synthesis Systems," Presented at European Signal Processing Conference, A Coruna, Spain, Sep. 2-6, 2019; CoRR, Submitted on Aug. 21, 2019, arXiv:1811.04769v3, 5 pages.

Song et al., "Generative Modeling by Estimating Gradients of the Data Distribution," CoRR, Submitted on Oct. 10, 2020, arXiv:1907.05600v3, 23 pages.

Song et al., "Generative Modeling by Estimating Gradients of the Data Distribution," CoRR, Submitted on Oct. 29, 2020, arXiv:1907.05600v2, 23 pages.

Song et al., "Improved Techniques for Training Score-Based Generative Models," CoRR, Submitted on Oct. 23, 2020, arXiv:2006.09011v2, 31 pages.

Song et al., "Sliced Score Matching: A Scalable Approach to Density and Score Estimation," CoRR, Submitted on Jun. 27, 2019, arXiv:1905.07088v2, 31 pages.

Sotelo et al., "Char2Wav: End-to-End Speech Synthesis," Presented at International Conference on Learning Representations, Toulon, France, Apr. 24-26, 2017, 6 pages.

Srivastava et al., "Dropout: a simple way to prevent neural networks from overfilling," Journal of Machine Learning Research, Jun. 14, 2014, 15(1):1929-1958.

Stern et al., "Insertion Transformer: Flexible Sequence Generation via Insertion Operations," Presented at International Conference on

(56) References Cited

OTHER PUBLICATIONS

Machine Learning, Long Beach CA, Jun. 9-15, 2019; CoRR, Submitted on Feb. 8, 2019, arXiv:1902.03249v1, 10 pages.

Valin et al., "LPCNet: Improving Neural Speech Synthesis through Linear Prediction," Presented at International Conference on Acoustics, Speech, and Signal Processing, Brighton, UK, May 12-17, 2019; CoRR, Submitted on Feb. 19, 2019, arXiv:1810.11846v2, 5 pages.

van den Oord et al., "Parallel WaveNet: Fast High-Fidelity Speech Synthesis," Presented at International Conference on Machine Learning, Sydney, Australia, Aug. 6-11, 2017; CoRR, Submitted on Nov. 28, 2017, arXiv:1711.10433v1, 11 pages.

van den Oord et al., "WaveNet: A Generative Model for Raw Audio," CoRR, Submitted on Sep. 19, 2016, arXiv:1609.03499v2, 15 pages.

Vaswani et al., "Attention Is All You Need," Presented at Presented at Advances in Neural Information Processing Systems, Long Beach CA, Dec. 4-9, 2017: CoRR, Submitted on Dec. 6, 2017, arXiv:1706.03762v5, 15 pages.

Vincent, "A connection between score matching and denoising auto encoders," Neural Computation, Jul. 2011, 23(7):1661-1674.

Wang et al., "Neural Source-Filter Waveform Models for Statistical Parametric Speech Synthesis," CoRR, Submitted on Apr. 27, 2019, arXiv:1810.11946v4, 11 pages.

Wang et al., "Tacotron: Towards End-to-End Speech Synthesis," Presented at Interspeech, Stockholm, Sweden, Aug. 20-24, 2017; CoRR, Submitted on Apr. 6, 2017, arXiv:1703.10135v2, 10 pages.

Weiss et al., "Wave-Tacotron: Spectrogram-free end-to-end text-to-speech synthesis," CoRR, Submitted on Feb. 5, 2021, arXiv:2011.03568v2, 6 pages.

Wu et al., "WaveFFJORD: FFJORD-Based Vocoder for Statistical Parametric Speech Synthesis," Presented at International Conference on Acoustics, Speech, and Signal Processing, Virtual Conference, May 4-8, 2020, 1 page (abstract only).

Yamamoto et al., "Parallel WaveGAN: A Fast Waveform Generation Model Based on Generative Adversarial Networks with Multi-Resolution Spectrogram," Presented at International Conference on Acoustics, Speech, and Signal Processing, Virtual Conference, May 4-8, 2020; CoRR, Submitted on Feb. 6, 2020, arXiv:1910.11480v2, 5 pages.

Yang et al., "Multiband MelGAN: Faster waveform generation for high-quality text-to-speech," CoRR, Submitted on Nov. 17, 2020, arXiv:2005.05106v2, 7 pages.

Yang et al., "VocGAN: A High-Fidelity Real-time Vocoder with a Hierarchically-nested Adversarial Network," CoRR, Submitted on Jul. 30, 2020, arXiv:2007.15256v1, 5 pages.

Yu et al., "DurIAN: Duration informed attention network for multimodal synthesis," CoRR, Submitted on Sep. 5, 2019, arXiv:1909.01700v2, 11 pages.

Notice of allowance in Korean Appln. No. 10-2022-7045943, mailed on Dec. 27, 2024, 5 pages (with English translation).

Hearing Notice in Indian Appln. No. 202227076349, mailed on Feb. 21, 2025, 4 pages.

Office Action in Chinese Appln. No. 202180045795.6, mailed on Apr. 26, 2025, 21 pages (with English translation).

Yu et al., "A fast noise level estimation algorithm based on convolutional neural networks," The Journal of Nanchang University (Science Version), Oct. 2019, 43(5):1-7.

\* cited by examiner

END-TO-END SPEECH WAVEFORM GENERATION THROUGH DATA DENSITY GRADIENT ESTIMATION

CROSS-REFERENCE TO RELATED APPLICATION

This application is a National Stage Application under 35 U.S.C. § 371 and claims the benefit of International Application No. PCT/US2021/048937, filed on Sep. 2, 2021, which claims priority to U.S. Application No. 63/073,867, filed Sep. 2, 2020 and U.S. Application No. 63/170,401, filed Apr. 2, 2021, the disclosures of which are incorporated herein by reference.

BACKGROUND

This specification relates to generating waveforms conditioned on text sequences using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates a waveform conditioned on a text sequence.

According to a first aspect there is provided a method performed by one or more computers, the method comprising: obtaining a phoneme sequence, the phoneme sequence comprising a respective phoneme token at each of a plurality of input time steps; processing the phoneme sequence using an encoder neural network to generate a hidden representation of the phoneme sequence; generating, from the hidden representation, a conditioning input; initializing a current waveform output; and generating a final waveform output that defines an utterance of the phoneme sequence by a speaker by updating the current waveform output at each of a plurality of iterations, wherein each iteration corresponds to a respective noise level, and wherein the updating comprises, at each iteration: processing a model input for the iteration comprising (i) the current waveform output and (ii) the conditioning input using a noise estimation neural network that is configured to process the model input to generate a noise output, wherein the noise output comprises a respective noise estimate for each value in the current waveform output; and updating the current waveform output using the noise estimate and the noise level for the iteration.

In some implementations, the noise estimation neural network and the encoder neural network have been trained end-to-end on training data that includes a plurality of training phoneme sequences and for each training phoneme sequence a respective ground truth waveform.

In some implementations, updating the current waveform output using the noise estimate and the noise level for the iteration comprises: generating an update for the iteration from at least the noise estimate and the noise level corresponding to the iteration; and subtracting the update from the current waveform output to generate an initial updated output waveform.

In some implementations, updating the current waveform output further comprises: modifying the initial updated output waveform based on the noise level for the iteration to generate a modified initial updated output waveform.

In some implementations, for the last iteration, the modified initial updated output waveform is the updated output waveform after the last iteration and, for each iteration prior to the last iteration, the updated output waveform after the last iteration is generated by adding noise to the modified initial updated output waveform.

In some implementations, initializing the current waveform output comprises: sampling each of a plurality of initial values for the current waveform output from a corresponding noise distribution.

In some implementations, the model input at each iteration includes iteration-specific data that is different for each iteration.

In some implementations, the model input for each iteration includes the noise level corresponding to the iteration.

In some implementations, the model input for each iteration includes an aggregate noise level for the iteration generated from the noise levels corresponding to the iteration and to any iterations after the iteration in the plurality of iterations.

In some implementations, the noise estimation neural network comprises: a noise generation neural network comprising a plurality of noise generation neural network layers and configured to process the conditioning input to map the conditioning input to the noise output, and a output waveform processing neural network comprising a plurality of output waveform processing neural network layers configured to process the current waveform output to generate an alternative representation of the current waveform output, wherein: at least one of the noise generation neural network layers receives an input that is derived from (i) an output of another one of the noise generation neural network layers, (ii) an output of a corresponding output waveform processing neural network layer, and (iii) the iteration-specific data for the iteration.

In some implementations, the final output waveform has a higher dimensionality than the conditioning input, and wherein the alternative representation has a same dimensionality as the conditioning input.

In some implementations, the noise estimation neural network comprises a respective Feature-wise Linear Modulation (FiLM) module corresponding to each of the at least one noise generation neural network layers, wherein the FiLM module corresponding to a given noise generation neural network layer is configured to process (i) the output of the other one of the noise generation neural network layers, (ii) the output of the corresponding output waveform processing neural network layer, and (iii) the iteration-specific data for the iteration to generate the input to the noise generation neural network layer.

In some implementations, the FiLM module corresponding to the given noise generation neural network layer is configured to: generate a scale vector and a bias vector from (ii) the output of the corresponding output waveform processing neural network layer, and (iii) the iteration-specific data for the iteration; and generate the input to the given noise generation neural network layer by applying an affine transformation to the output of (i) the other one of the noise generation neural network layers.

In some implementations, the at least one of the noise generation neural network layers includes an activation function layer that applies a non-linear activation function to the input to the activation function layer.

In some implementations, the other one of the noise generation neural network layers corresponding to the activation function layer is a residual connection layer or a convolutional layer.

In some implementations, the hidden representation includes a respective hidden vector for each of a plurality of hidden time steps, and wherein generating, from the hidden representation, a conditioning input comprises: processing the hidden representation using a duration predictor neural network to generate, for each hidden time step, a predicted duration in the utterance that is characterized by the hidden vector at the hidden time step; and generating the conditioning input by upsampling the hidden representation according to the predicted durations to match a time scale of the final waveform output.

In some implementations, the conditioning input comprises a respective conditioning vector for each of a plurality of quantized time segments within the final waveform output.

In some implementations, the method further comprises: generating, for each hidden time step, a predicted influence range in the utterance that is characterized by the hidden vector at the hidden time step, and wherein upsampling the hidden representation comprises applying Gaussian upsampling to the hidden representation using the predicted durations and the predicted influence ranges for the hidden time steps.

Particular embodiments of the subject matter described in this specification can be implemented so as to realize one or more of the following advantages.

The described techniques generate output waveforms in a non-autoregressive manner directly from text sequences. Generally, auto-regressive models have been shown to generate high quality waveforms but require a large number of iterations, resulting in high latency and resource, e.g., memory and processing power, consumption. This is because auto-regressive models generate each given output within an output waveform one by one, with each being conditioned on all of the outputs that precede the given output within the output waveform.

The described techniques, on the other hand, start from an initial output waveform, e.g., a noisy output that includes values sampled from a noise distribution, and iteratively refine the output waveform via a gradient-based sampler conditioned on a conditioning input generated from the text sequence, i.e. an iterative denoising process may be used. As a result, the approach is non-autoregressive and requires only a constant number of generation steps during inference. For example, for audio synthesis, the described techniques can generate high fidelity audio samples in very few iterations, e.g., six or fewer, that compare to or even exceed those generated by state of the art autoregressive models with greatly reduced latency and while using many fewer computational resources. In addition, the described techniques can generate higher quality (e.g. higher fidelity) audio samples than those produced by existing non-autoregressive models.

Additionally, unlike previous approaches to non-autoregressive generation, the described techniques generate audio directly from a sequence of phonemes, i.e., without requiring an intermediate structured representation like mel-spectrogram features. This allows the system to generate audio without using a separate model to generate the spectrogram features. This also allows the system to be trained entirely end-to-end and therefore improves the ability of the system to generalize to new inputs after training and to perform better on a variety of text-to-speech tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
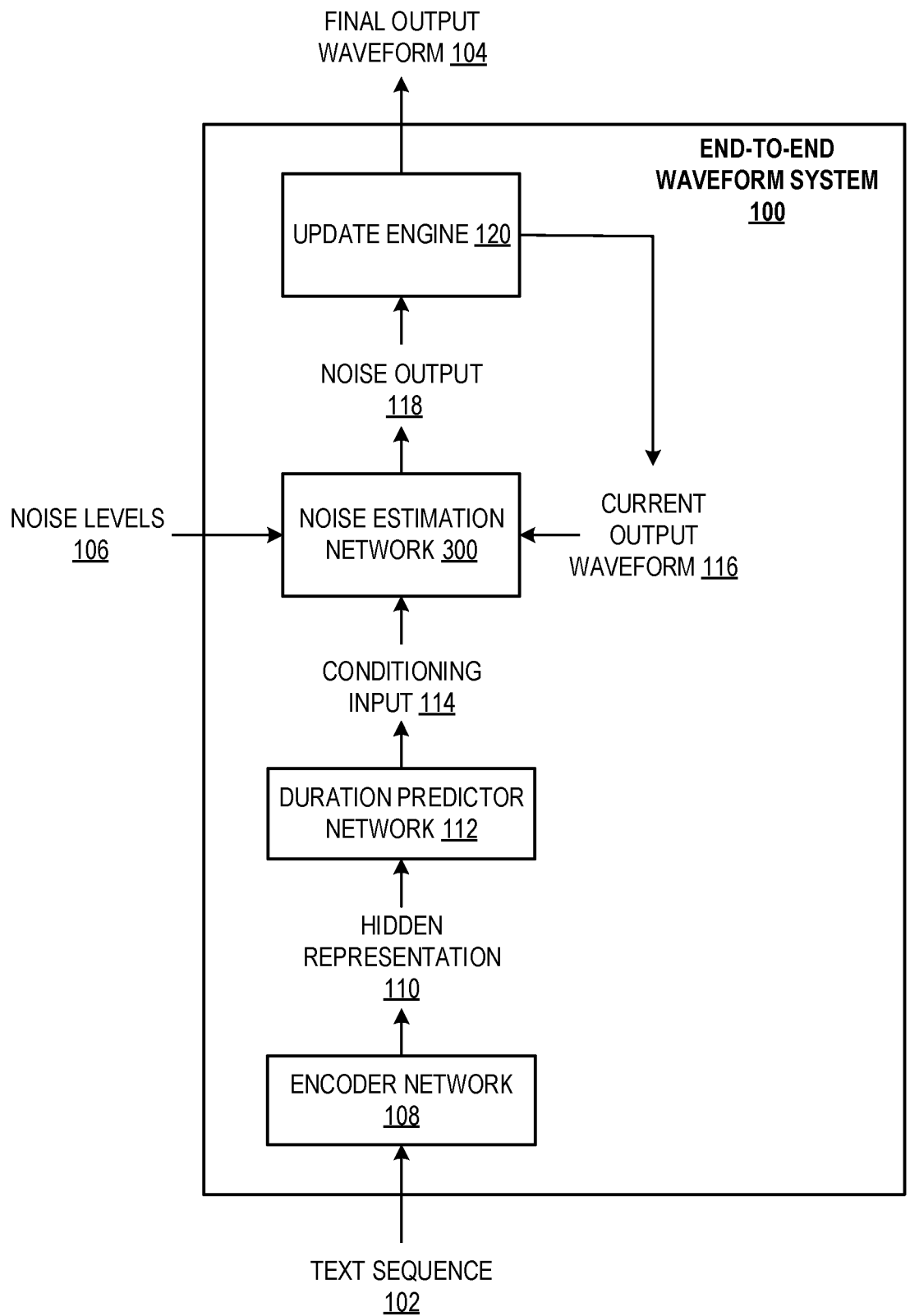
FIG. 1 is a block diagram of an example end-to-end waveform system.

FIG. 1 shows an example end-to-end waveform system 100. The end-to-end waveform system 100 is an example of a system implemented as computer programs on one or more computers in one or more locations in which the systems, components, and techniques described below are implemented.

The end-to-end waveform system 100 generates a final waveform output 104 conditioned on a text sequence 102. The system 100 initializes a current waveform output 116 (e.g., by sampling from a noise distribution, such as a Gaussian noise distribution), and updates the current waveform output at each of multiple iterations using noise levels 106 and a conditioning input 114 generated from the text sequence 102. The system 100 outputs the updated output waveform after the final iteration as the final output waveform 104.

In some implementations, the final waveform output 104 can represent an utterance in which the text sequence 102 is being spoken by a speaker. The text sequence 102 can be represented by a series of phoneme tokens, including silence tokens inserted at word boundaries and end-of-sequence tokens inserted after each sentence. For example, the sequence of phonemes can be generated from text or linguistic features of the text, so that the waveform generated by the system represents an utterance of the text being spoken. The output waveform generated by the system can be a sequence of amplitude values, e.g., raw amplitude values, compressed amplitude values, or companded amplitude values, at a specified output frequency. Once generated, the system can provide the output waveform for playback of the utterance or can play back the utterance using an audio output device.

The end-to-end waveform system 100 generates the conditioning input 114 from the text sequence 102 using an encoder neural network 112 and a duration predictor network 112. The conditioning input 114 can include a respective conditioning vector for each of multiple quantized time segments within the final waveform output. The quantized time segments can represent a resolution (e.g., 10 ms time segments) of the final output waveform with respect to the conditioning input 114. That is, for an example 0.8 s final output waveform, the final output waveform can be divided into a sequence of eighty 10 ms quantized time segments. The conditioning output 114 can then include eighty conditioning vectors, where each conditioning vector corresponds to a respective 10 ms quantized time segment.

The system 100 generates a hidden representation 110 of the text sequence 102 by processing the text sequence 102 using the encoder neural network 108. The hidden representation can include a respective hidden vector for each of multiple hidden time steps. The final output waveform 104 can have a higher frequency than the hidden representation 110, and the hidden representation 110 can have a same frequency as the text sequence (e.g., a same frequency as a phoneme sequence representing the text sequence, where each hidden vector corresponds to a phoneme token). For example, each hidden vector can be represented by a collection of ordered numerical values, such as a vector of numerical values.

The encoder neural network 108 can have any appropriate neural network architecture that enables it to perform its described function, i.e., processing a text sequence to generate a hidden representation of the text sequence. In particular, the encoder neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers). For example, the encoder neural network can be a recurrent neural network, e.g., an LSTM or GRU neural network. In a particular example, the encoder neural network can include an embedding layer followed by one or more convolutional layers and then one or more bi-directional LSTM neural network layers.

The system 100 generates the conditioning input 114 from the hidden representation 110 by "upsampling" (that is, increasing the frequency of) the hidden representation 110. To upsample the hidden representation 110, the system 100 generates a respective predicted duration in an utterance of the text sequence for each hidden time step. The predicted duration of a hidden time step corresponds to the predicted duration of the utterance that is characterized by the hidden vector at the hidden time step.

The system 100 generates the predicted durations by processing the hidden representations using the duration predictor network 112. The predicted durations can be represented by, e.g., a collection of ordered numerical values, such as a vector of numerical values, with each numerical value corresponding to a different hidden time step. That is, the duration predictor neural network 112 is configured to process the hidden representations to generate a respective predicted duration for each hidden time step, e.g., an integer duration (e.g., a number of frames) for the utterance that is characterized by the hidden vector at the hidden time step, or an integer duration measured in any time unit (e.g., seconds) for the utterance that is characterized by the hidden vector at the time step.

The duration predictor network 112 can have any appropriate neural network architecture that enables it to perform its described function, i.e., processing a hidden representation of a text sequence to generate a respective predicted duration for each hidden time step in the hidden representation. In particular, the duration predictor neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers). For example, the duration predictor neural network can be a recurrent neural network, e.g., an LSTM or GRU neural network. In a particular example, the duration predictor neural network can include one or more bi-directional LSTM layers followed by a projection layer.

For example, the system 100 can upsample the hidden representations using Gaussian upsampling. To perform Gaussian upsampling, the system 100 can further process the predicted durations and hidden representations to generate for each hidden time step a respective predicted influence range for the utterance (e.g., represented by a positive numerical value) characterized by the hidden vector at the hidden time step. The predicted influence range for the utterance can represent the range of the influence of the utterance. Then, the system can upsample the hidden representation using the predicted durations and influence ranges (e.g., where each predicted duration—influence range pair are the mean and standard deviation of a Gaussian distribution for the hidden time step, respectively). Examples of Gaussian upsampling are described in more detail with reference to: Jonathan Shen, et al., "Non-Attentive Tacotron: Robust And Controllable Neural TTS Synthesis Including Unsupervised Duration Modeling," arXiv: 2010.04301v4, 11 May 2021, which is incorporated herein by reference.

In some implementations, the predicted influence ranges can be generated by an influence range predictor neural network. The influence range predictor neural network can process the hidden representation concatenated with the predicted durations to generate the predicted influence ranges. For example, the influence range predictor neural network can be a recurrent neural network, e.g., an LSTM or a GRU. In a particular example, the influence range predictor neural network can include one or more bi-directional LSTM layers followed by a projection layer, and then a softplus layer.

The system 100 initializes a current waveform output 116, and updates the current waveform output at each of multiple iterations using noise levels 106 and the conditioning input 114 generated from the text sequence 102. The system 100 outputs the updated waveform output after the final iteration as the final waveform output 104.

For example, the system 100 can initialize the current output waveform 116 (that is, can generate the first instance of the current output waveform 116), by sampling each value in the current output waveform from a corresponding noise distribution (e.g., a Gaussian distribution, such as $N(0,I)$, where I is an identity matrix). That is, the initial current output waveform 116 includes the same number of values as the final output waveform 104, but with each value being sampled from a corresponding noise distribution.

The system 100 then generates the final output waveform 104 by updating the current output waveform 116 at each of multiple iterations using the conditioning input 114 generated from the text sequence 102. In other words, the final output waveform 104 is the current output waveform 116 after the last iteration of the multiple iterations.

In some cases, the number of iterations is fixed.

In other cases, the system 100 or another system can adjust the number of iterations based on a latency requirement for the generation of the final output waveform. That is, the system 100 can select the number of iterations so that the final output waveform 104 will be generated to satisfy the latency requirement.

In yet other cases, the system 100 or another system can adjust the number of iterations based on a computational resource consumption requirement for the generation of the final output waveform 104, i.e., can select the number of iterations so that the final output waveform will be generated to satisfy the requirement. For example, the requirement can be a maximum number of floating operations (FLOPS) to be performed as part of generating the final output waveform.

At each iteration, the system processes a model input for the iteration that includes (i) the current output waveform 116, (ii) the conditioning input 114, and optionally (iii) iteration-specific data for the iteration using a noise estimation neural network 300. The iteration specific data is generally derived from noise levels 106 (e.g., where each noise level corresponds to a particular iteration). The system can update the current output waveform using the noise levels 106 as a scale for each iteration of update. That is, each noise level in the noise levels 106 can correspond to a particular iteration, and the respective noise level for an iteration can guide the scale of the update to the current output waveform 116 at the iteration.

The noise estimation neural network 300 is a neural network that has parameters ("network parameters") and that is configured to process the model input in accordance with the current values of the network parameters to generate a noise output 110 that includes a respective noise estimate for each value in the current output waveform 116. The details of the noise estimation neural network are discussed with further detail with respect to FIG. 3 below.

Generally, the noise estimate for a given value in the current output waveform is an estimate of the noise that has been added to the corresponding actual value in the actual output waveform for the text sequence in order to generate the given value. That is, the noise estimate defines how the actual value, if known, would need to be modified to generate the given value in the current output waveform given a noise level corresponding to the current iteration. In other words, the given value could be generated by applying the noise estimate to the actual value in accordance with the noise level for the current iteration.

This noise estimate can be interpreted as an estimate of the gradient of the data density, and therefore the generation process can be seen as a process that iteratively generates the output waveform through data density estimation.

The system 100 then updates the current output waveform 116 in the direction of the noise estimate using an update engine 120.

In particular, the update engine 120 updates the current output waveform 116 using the noise estimate and the corresponding noise level for the iteration. That is, the update engine 120 updates each value of the current output waveform 116 using the corresponding noise estimate of the noise output 110 and the corresponding noise level at the iteration, as is discussed in further detail with respect to FIG. 2.

After the final iteration, the conditional output generation system 100 outputs the updated output waveform 116 as the final output waveform 104. For example, in implementations where the final output waveform 104 represents an audio waveform, the system can play back the audio using a speaker, or transmit the audio for playback, etc. In some implementations, the system 100 can save the final output waveform 104 to a data store, or transmit the final output waveform 104 to be stored remotely.

Prior to the system 100 using the noise estimation neural network 300, duration predictor neural network 112, and the encoder neural network 108 to generate final output waveforms, the system 100 or another system trains the neural networks using training data. In implementations including a range influence neural network, the system also trains the range influence neural network using the training data. The training data can include multiple training text sequences and, for each training text sequence, respective target durations and a respective ground truth waveform, as is described with reference to FIG. 7.

The training data can include respective target durations for each text sequence (e.g., where each text sequence is represented by a respective phoneme sequence, a respective target duration for each phoneme in the phoneme sequence). The duration predictor neural network can be trained using a loss function with at least a duration loss term which measures an error between the target durations and the predicted durations for each training text sequence. The predicted durations can be used for the loss function to train the predictor neural network, and the target durations can be used to upsample the hidden representations during training.

Figure 2:
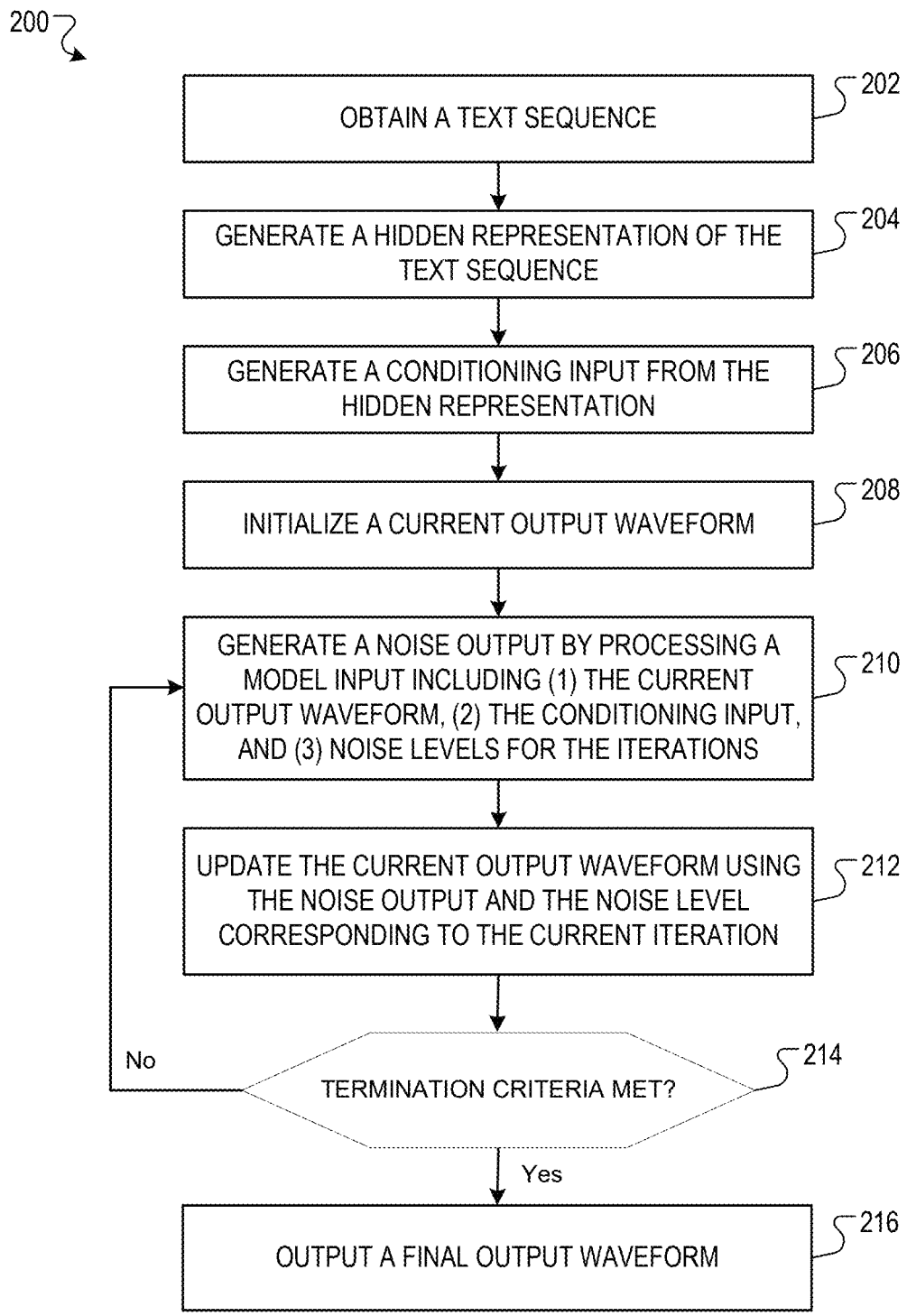
FIG. 2 is a flow diagram of an example process for generating waveforms conditioned on text sequences.

FIG. 2 is a flow diagram of an example process 200 for generating outputs conditioned on text sequences. For convenience, the process 200 will be described as being performed by a system of one or more computers located in one or more locations. For example, a conditional output generation system, e.g., the conditional output generation system 100 of FIG. 1, appropriately programmed in accordance with this specification, can perform the process 200.

The system obtains a text sequence (202) on which to condition a final output waveform. For example, the text sequence can be represented by a phoneme sequence (e.g., generated from the text or linguistic features of the text), and the final output waveform can represent an utterance of the phoneme sequence by a speaker.

The system generates a hidden representation of the text sequence (204) using an encoder neural network. The hidden representation can include a hidden vector for each of multiple hidden time steps. In a particular example, the encoder neural network can include an embedding layer, one or more convolutional layers, and one or more bi-directional LSTM layers.

The system generates a conditioning input from the hidden representation (206). The system can generate the conditioning input from the hidden representation using upsampling. For example, the system can generate the conditioning input using Gaussian upsampling. The system can generate a predicted duration for each hidden time step in the hidden representation by using a duration predictor neural network to process the hidden representation. Additionally, the system can generate a predicted influence range for each hidden time step in the hidden representation by using an influence range predictor neural network to process the hidden representation combined with, e.g., concatenated with the predicted durations. Then, the system can use Gaussian upsampling to generate the conditioning input from the hidden representation, predicted durations, and predicted influence ranges. Examples of Gaussian upsampling are described in more detail with reference to: Jonathan Shen, et al., "Non-Attentive Tacotron: Robust And Controllable Neural TTS Synthesis Including Unsupervised Duration Modeling," arXiv:2010.04301v4, 11 May 2021, which is incorporated herein by reference.

The system initializes a current output waveform (208). For a final output waveform including multiple values, the system can sample each value in an initial current output waveform having the same number of values as the final output waveform from a noise distribution. For example, the system can initialize a current output waveform using a noise distribution (e.g., a Gaussian noise distribution), represented by $y_N \sim N(\mathbf{0}, I)$, where I is an identity matrix and the N in $y_N$ represents the intended number of iterations. The system can update the initial current output waveform over the N iterations, from iteration N to iteration 1, in descending order.

The system then updates the current output waveform at each of multiple iterations. Generally, the current output waveform at each iteration can be interpreted as the final output waveform with additional noise. That is, the current output waveforms are noisy versions of the final output waveform. For example, for an initial current output waveform $y_N$, where N represents the number of iterations, the system can update the current output waveform at each of iterations N through 1 by removing an estimate for the noise corresponding to the iteration. That is, the system can refine the current output waveform at each iteration by determining an estimate for the noise and updating the current output waveform in accordance with the estimate. The system can use a descending order for the iterations until outputting the final output waveform, $y_0$.

At each of the multiple iterations, the system generates a noise output for the iteration by processing a model input including (1) the current output waveform, (2) the conditioning input, and optionally (3) iteration-specific data for the iteration (210) using a noise estimation neural network. The iteration-specific data is generally derived from noise levels for the iterations, where each noise level corresponds to a particular iteration. The noise output can include a noise estimate for each value in the current output waveform. For example, the respective noise estimate for a particular value in the current output waveform can represent an estimate of the noise that has been added to the corresponding actual value in an actual output waveform for the phoneme sequence to generate the particular value. That is, the noise estimate for the particular value would represent how the actual value, if known, would need to be modified given the corresponding noise level to generate the particular value.

At each of the multiple iterations, the system updates the current output waveform as of the current iteration using the noise output for the current iteration and the noise level corresponding to the current iteration (212). The system can update each value in the current output waveform using the corresponding noise estimate in the noise output and the noise level for the current iteration. The system can generate an update for the iteration from the noise estimate and noise level for the iteration, and then subtract the update from the current output waveform to generate an initial updated output waveform. Then, the system can modify the initial updated output waveform based on the noise level for the iteration to generate a modified initial updated output waveform, as, $$y_{n-1} = \frac{1}{\sqrt{\alpha_n}}\left(y_n - \frac{1-\alpha_n}{\sqrt{1-\overline{\alpha}_n}}\epsilon_\theta(y_n, x, \sqrt{\overline{\alpha}_n})\right), \quad (1)$$

where n indexes the iterations, $y_n$ represents the current output waveform at iteration n, $y_{n-1}$ represents the modified initial updated output waveform, x represents the conditioning input, $\alpha_n$ represents the noise level for iteration n, $\overline{\alpha}_n$ represents an aggregate noise level for iteration n (e.g., which is generated from the noise levels at the current iteration and at any iteration after the current iteration), and $$\epsilon_\theta(y_n, x, \sqrt{\overline{\alpha}_n})$$

represents the noise output generated by the noise estimation neural network with parameters θ. The noise level $\alpha_n$ and aggregate noise level $\overline{\alpha}_n$ can be determined from a noise schedule $\{\beta_n\}_{n=1}^N$ (e.g., a linear noise schedule ranging linearly from a minimum value to a maximum value, a Fibonacci-based schedule, or a custom schedule generated from data-driven or heuristic methods). The noise level $\alpha_n = 1 - \beta_n$, and the aggregate noise level $\overline{\alpha}_n$ can be sampled from a uniform distribution as $$\sqrt{\overline{\alpha}_n} \sim U(l_{n-1}, l_n), \quad (2)$$

where n indexes the iterations, $l_0 = 1$, $\forall n > 0$:

$$l_n = \sqrt{\Pi_{i=1}^n (\alpha_i)}.$$

Sampling $$\sqrt{\overline{\alpha}_n}$$

as in equation (2) enables to system to generate updates based on different scales of noise. The noise level $\alpha_n$ and aggregate noise level $\overline{\alpha}_n$ for each iteration n can be predetermined and obtained by the system as a part of the model input.

For the last iteration, the modified initial updated output waveform is the updated output waveform after the last iteration and, for each iteration prior to the last iteration, the updated output waveform after the last iteration is generated by adding noise to the modified initial updated output waveform. That is, if the iteration is not the final iteration (that is, if $n > 1$), the system further updates the modified initial updated output waveform as, $$y_{n-1} = y_{n-1} + \sigma_n z \quad (3)$$

where n indexes the iterations, $\sigma_n$ can be determined from the noise schedule $\{\beta_n\}_{n=1}^N$ or another method (e.g., as a function of the noise schedule, or determined via hyperparameter tuning using empirical experiments), and $z \sim N(\mathbf{0}, I)$. The $\sigma_n$ is included to enable modeling the multi-modal distribution.

The system determines whether or not the termination criteria have been met (214). For example, the termination criteria can include having performed a specific number of iterations (e.g., determined to meet a minimum performance metric, a maximum latency requirement, or a maximum computation resource requirement such as maximum number of FLOPS). If the specific number of iterations have not been performed, the system can begin again from step (206) and perform another update to the current output waveform.

If the system determines that the termination criteria have been met, the system outputs a final output waveform (216), which is the updated output waveform after the final iteration.

The process 200 can be used to generate output waveforms in a non-autoregressive manner conditioned on phoneme sequences. Generally, auto-regressive models have been shown to generate high quality output waveforms but require a large number of iterations, resulting in high latency and resource, e.g., memory and processing power, consumption. This is because auto-regressive models generate each given output within an output waveform one by one, with each being conditioned on all of the outputs that precede the given output within the output waveform. The process 200, on the other hand, start from an initial output waveform, e.g., a noisy output that includes values sampled from a noise distribution, and iteratively refine the output waveform via a gradient-based sampler conditioned on the phoneme sequence. As a result, the approach is non-autoregressive and requires only a constant number of generation steps during inference. For example, for audio synthesis conditioned on a spectrogram, the described techniques can generate high fidelity audio samples in very few iterations, e.g., six or fewer, that compare to or even exceed those generated by state of the art autoregressive models with greatly reduced latency and while using many fewer computational resources.

Additionally, unlike previous approaches to non-autoregressive generation, the described techniques generate audio directly from a sequence of phonemes, i.e., without requiring an intermediate structured representation like mel-spectrogram features. This allows the system to generate audio without using a separate model to generate the spectrogram features. This also allows the system to be trained entirely end-to-end and therefore improves the ability of the system to generalize to new inputs after training and to perform better on a variety of text-to-speech tasks.

Figure 3:
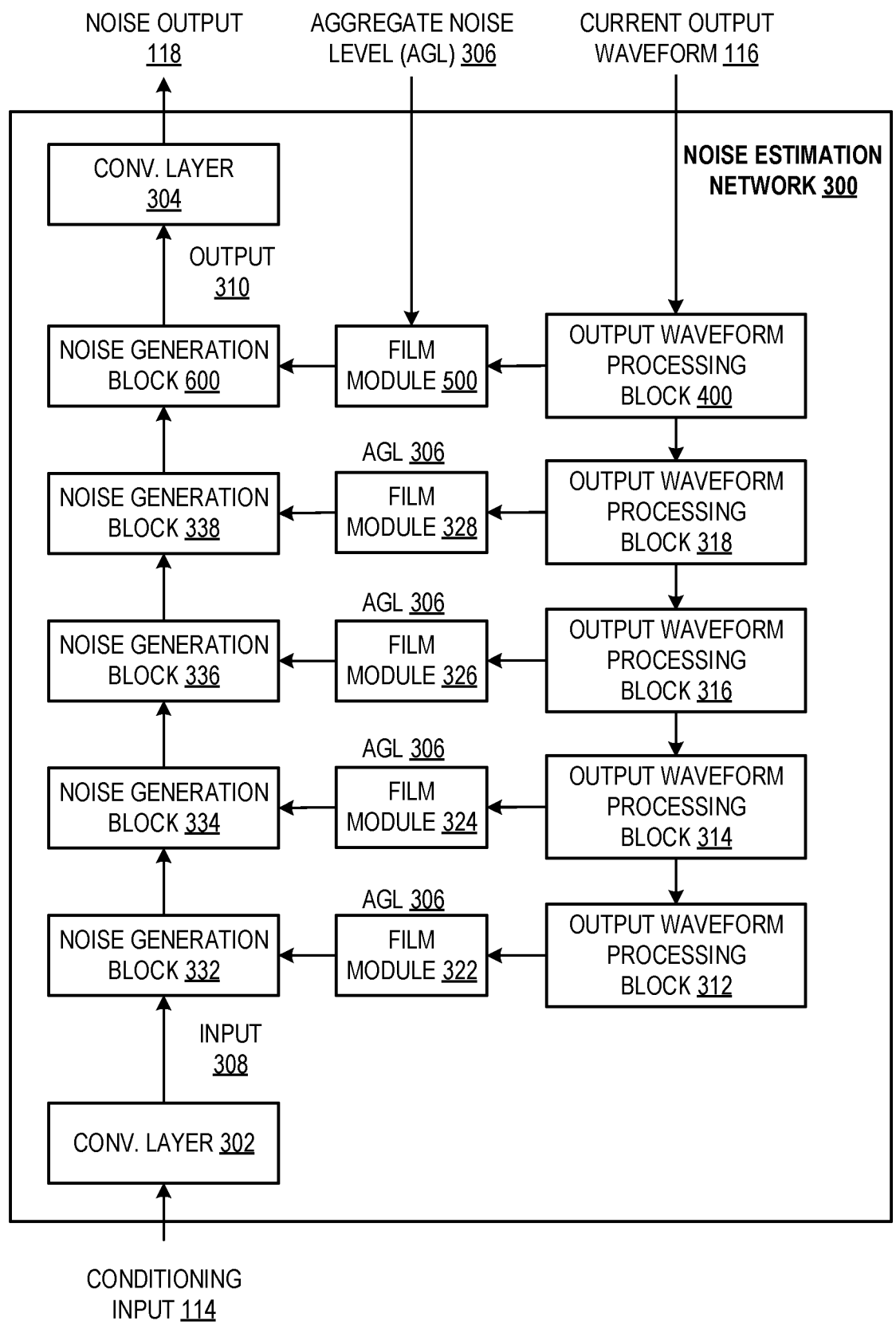
FIG. 3 is a block diagram of an example noise estimation neural network.

FIG. 3 shows an example architecture of the noise estimation network 300.

The example noise estimation network 300 includes multiple types of neural network layers and neural network blocks (e.g., where each neural network block includes multiple neural network layers), including convolutional neural network layers, noise generation neural network blocks, Feature-wise Linear Modulation (FiLM) module neural network blocks, and output waveform processing neural network blocks.

The noise estimation network 300 processes a model input including (1) a current output waveform 116, (2) a conditioning input 114, and (3) iteration-specific data including aggregate noise level 306 corresponding to the current iteration to generate a noise output 118. The current output waveform 116 has a higher dimensionality (e.g., frequency) than the conditioning input 114, and the noise output 118 has a same dimensionality (e.g., frequency) as the current output waveform 116. For example, a current output waveform can represent an audio waveform at 24 kHz, and the conditioning input can be represented at 80 Hz.

The noise estimation network 300 includes multiple output waveform processing blocks to process the current output waveform 116 to generate respective alternative representations of the current output waveform 116.

The noise estimation network 300 also includes an output waveform processing block 400 to process the current output waveform 116 to generate an alternative representation of the current output waveform, where the alternative representation has a smaller dimensionality (e.g., frequency) than the current output waveform.

The noise estimation network 300 further includes additional output waveform processing blocks (e.g., output waveform processing blocks 318, 316, 314, and 312) to process the alternative representation generated by a previous output waveform processing block to generate another alternative representation having a yet smaller dimensionality (e.g., frequency) than the previous alternative representation (e.g., network 318 processes the alternative representation from block 400 to generate an alternative representation with a smaller dimensionality than the output of block 400, block 316 processes the alternative representation from block 318 to generate an alternative representation with a smaller dimensionality than the output of block 318, etc.). The alternative representation of the current output waveform generated from the final output waveform processing block (e.g., 312) has the same dimensionality (e.g., frequency) as the conditioning input 114.

For example, for a current output waveform including an audio waveform of 24 kHz and a conditioning input at 80 Hz, the output waveform processing block blocks can "downsample" the dimensionality (that is, reduce the frequency) by factors of 2, 2, 3, 5, and 5 (e.g., by output waveform processing blocks 400, 318, 316, 314, and 312, respectively) until the alternative representation produced by the final layer 312 is 80 Hz (i.e., reduced by a factor of 300 to match the conditioning input). The architecture of an example output waveform processing block is discussed in further detail with respect to FIG. 4.

The noise estimation block 300 includes multiple FiLM module neural network blocks to process the iteration-specific data (e.g., aggregate noise level 306) corresponding to the current iteration and the alternative representations from the output waveform processing neural network blocks to generate inputs for the noise generation neural network blocks. Each FiLM module processes the aggregate noise level 306 and the alternative representation from a respective output waveform processing block to generate an input for a respective noise generation block (e.g., FiLM module 500 processes the alternative representation from output waveform processing block 400 to generate an input for noise generation block 600, FiLM module 328 processes the alternative representation from output waveform processing block 318 to generate an input for noise generation block 338, etc.). In particular, each FiLM module generates a scale vector and a bias vector as input to a respective noise generation block (e.g., as input to affine transformation neural network layers within the respective noise generation block), as is discussed in further detail with reference to FIG. 5.

The noise estimation network 300 includes multiple noise generation neural network blocks to process the conditioning input 114 and the output from the FiLM modules to generate the noise output 118. The noise estimation network 300 can include a convolutional layer 302 to process the conditioning input 114 to generate an input to a first noise generation block 332, and a convolutional layer 304 to process output from a final noise generation block 600 to generate the noise output 118. Each noise generation block generates an output that has a higher dimensionality (e.g., frequency) than the conditioning input 114. In particular, each noise generation block after the first generates an output that has a higher dimensionality (e.g., frequency) than the output from the previous noise generation block. The final noise generation block generates an output with a same dimensionality (e.g., frequency) as the current output waveform 116.

The noise estimation network 300 includes a noise generation block 332 to process the output from the convolutional layer 302 (i.e., the convolution layer that processes the conditioning input 114) and the output from the FILM module 332 to generate an input to a noise generation block 334. The noise estimation network 300 further includes noise generation blocks 336, 338, and 600. Noise generation blocks 334, 336, 338, and 600 each process the output from a respective previous noise generation block (e.g., block 334 processes the output from block 332, block 336 processes the output from block 334, etc.) and the output from a respective FiLM module (e.g., noise generation block 334 processes the output from FILM module 324, noise generation block 336 processes the output from FILM module 326, etc.) to generate an input for the next neural network block. The noise generation block 600 generates an input for a convolutional layer 304 which processes the input to generate the noise output 118. The architecture of an example noise generation block (e.g., noise generation block 600) is discussed in further detail with respect to FIG. 6.

Each noise generation block prior to the last can generate an output that has the same dimensionality (e.g., frequency) as the corresponding alternative representation of the current output waveform (e.g., noise generation block 332 generates an output with a dimensionality equal to the alternative representation generated by the output waveform processing block 314, noise generation block 334 generates an output with a dimensionality equal to the output from output waveform processing block 316, etc.).

For example, for a current output waveform including an audio waveform of 24 kHz and a conditioning input at 80 Hz, the noise generation blocks can "upsample" the dimensionality (that is, increase the frequency) by factors of 5, 5, 3, 2, and 2 (e.g., by noise generation blocks 332, 334, 336, 338, and 600, respectively) until the output of the final noise generation block (e.g., noise generation block 600) is 24 kHz (i.e., increased by a factor of 300 to match the current output waveform 116).

Figure 4:
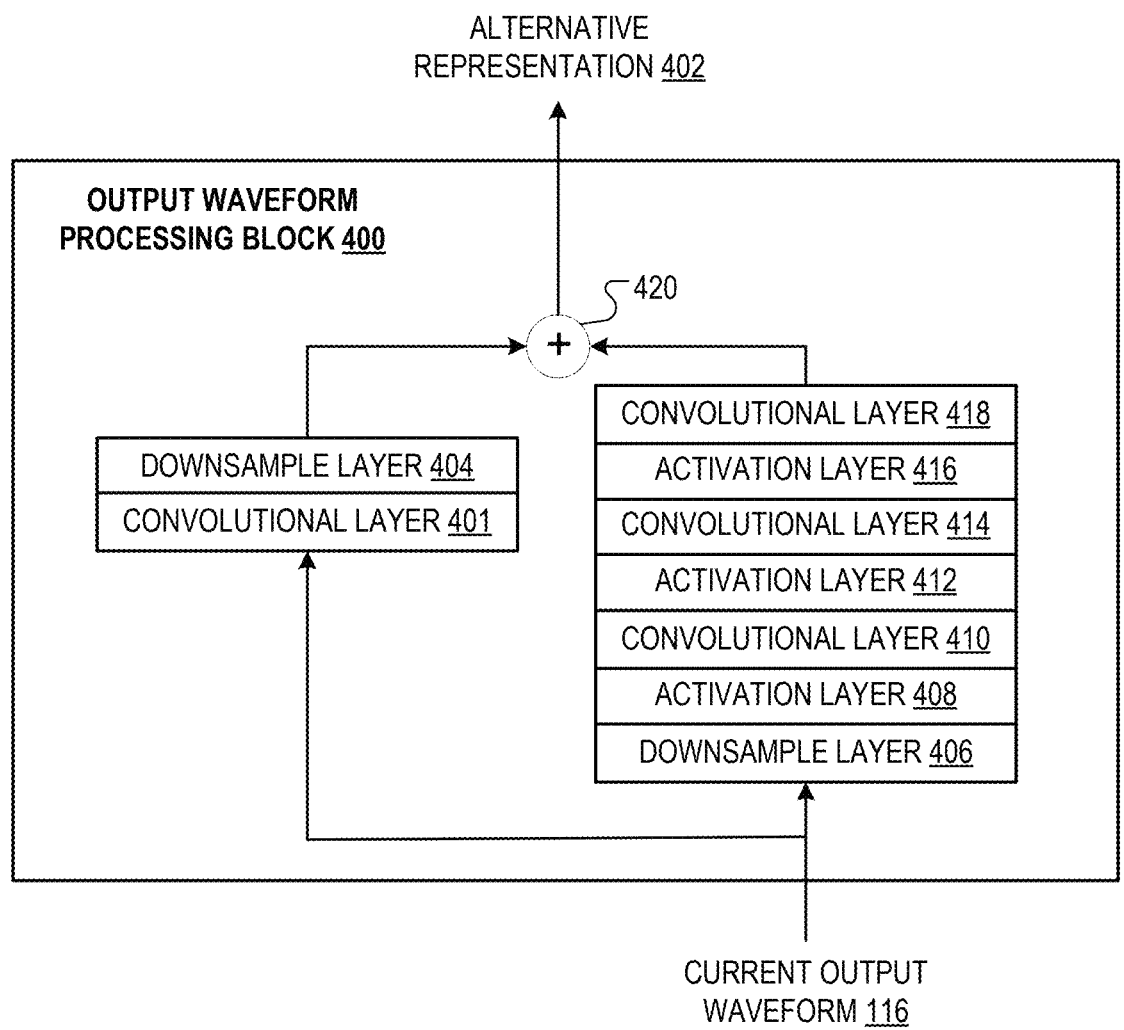
FIG. 4 is a block diagram of an example output waveform processing neural network block.

FIG. 4 shows an example architecture of the output waveform processing block 400.

The output waveform processing block 400 processes a current output waveform 116 to generate an alternative representation 402 of the current output waveform 116. The alternative representation has a smaller dimensionality than the current output waveform. The output waveform processing block 400 includes one or more neural network layers. The one or more neural network layers can include multiple types of neural network layers, including downsampling layers (e.g., to "downsample" or reduce the dimensionality of an input), activation layers having non-linear activation functions (e.g., a fully-connected layer with a leaky ReLU activation function), convolutional layers, and a residual connection layer.

For example, a downsample layer can be a convolutional layer with the necessary stride to reduce ("downsample") the dimensionality of the input. In a particular example, a stride of X can be used to reduce the dimensionality of the input by a factor of X (e.g., a stride of two can be used to reduce the dimensionality of the input by a factor of two; a stride of five can be used to reduce the dimensionality of the input by a factor of five, etc.).

The left branch of a residual connection layer 420 includes a convolutional layer 401 and a downsample layer 404. The convolutional layer 401 processes the current output waveform 116 to generate an input to the downsample layer 404. The downsample layer 404 processes the output from the convolutional layer 401 to generate an input to the residual connection layer 420. The output of the downsample layer 404 has a reduced dimensionality compared with the current output waveform 116. For example, the convolutional layer 401 can include filters of size 1×1 with stride 1 (i.e., to maintain the dimensionality), and the downsample layer 404 can include filters of size 2×1 with a stride of two to downsample the dimensionality of the input by a factor of two.

The right branch of the residual connection layer 420 includes a downsample layer 406 and three subsequent blocks of an activation layer followed by a convolutional layer (e.g., activation layer 408, convolutional layer 410, activation layer 412, convolutional layer 414, activation layer 416, and convolutional layer 418). The downsample layer 406 processes the current output waveform 116 to generate the input for subsequent three blocks of activation and convolutional layers. The output of the downsample layer 406 has a smaller dimensionality compared with the current output waveform 116. The subsequent three blocks process the output from the downsample layer 406 to generate an input to the residual connection layer 420. For example, the downsample layer 406 can include filters of size 2×1 with stride two to reduce the dimensionality of the input by a factor of two (e.g., to properly match downsample layer 404). The activation layers (e.g., 408, 412, and 416) can be fully-connected layers with leaky ReLU activation functions. The convolutional layers (e.g., 410, 414, and 418) can include filters of size 3×1 with stride one (i.e., to maintain dimensionality).

The residual connection layer 420 combines the output from the left branch and the output from the right branch to generate the alternative representation 402. For example, the residual connection layer 420 can add (e.g., elementwise addition) the output from the left branch and the output from the right branch to generate the alternative representation 402.

Figure 5:
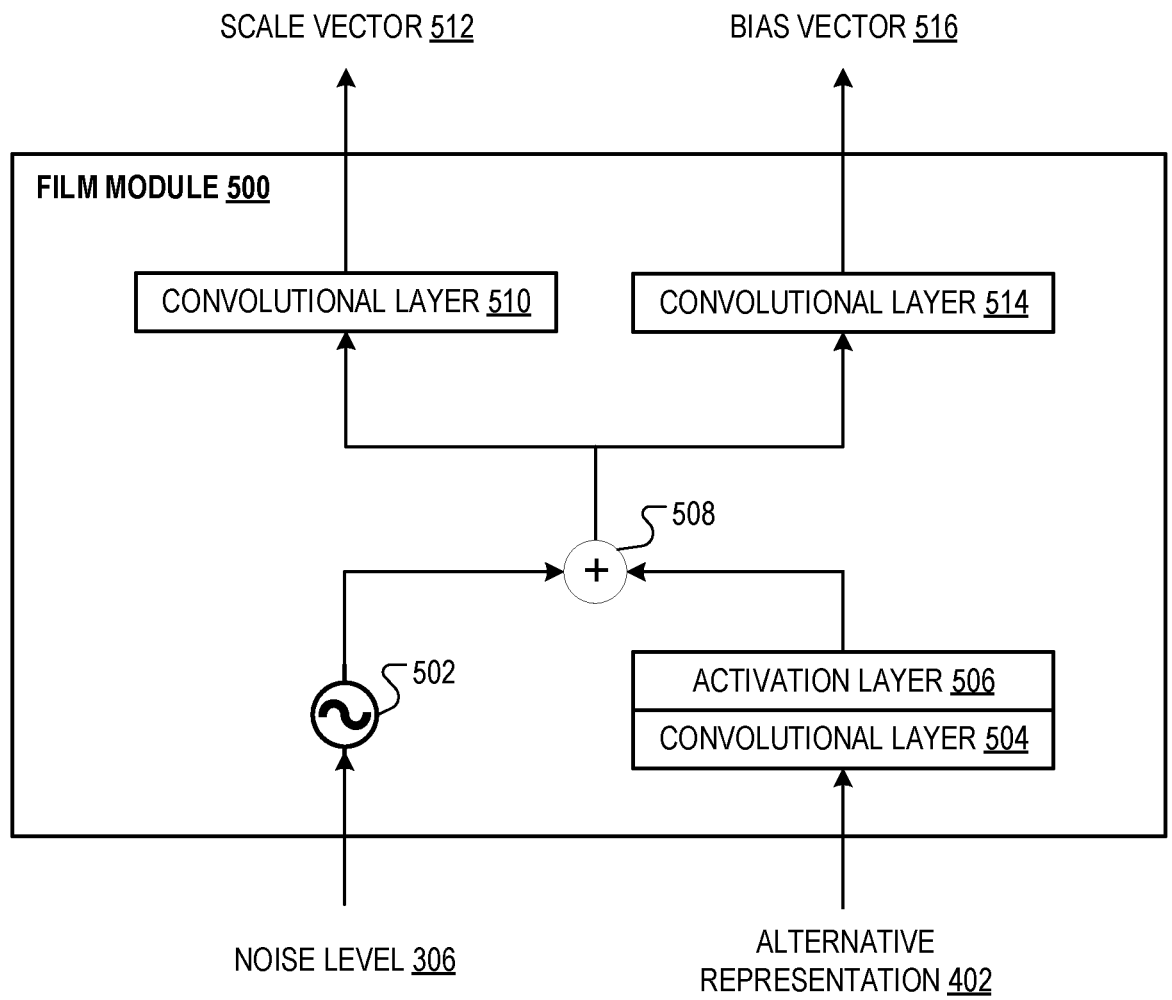
FIG. 5 is a block diagram of an example Feature-wise Linear Modulation (FiLM) module.

FIG. 5 shows an example Feature-wise Linear Modulation (FiLM) module 500.

The FiLM module 500 processes an alternative representation 402 of a current output waveform and an aggregate noise level 306 corresponding to the current iteration to generate a scale vector 512 and a bias vector 516. The scale vector 512 and the bias vector 516 can be processed as input to specific layers (e.g., affine transformation layers) in a respective noise generation block (e.g., noise generation block 600 in the noise estimation network 300 of FIG. 3). The FiLM module 500 includes a positional encoding function and one or more neural network layers. The one or more neural network layers can include multiple types of neural network layers, including residual connection layers, convolutional layers, and activation layers having non-linear activation functions (e.g., a fully-connected layer with a leaky ReLU activation function).

The left branch of a residual connection layer 508 includes a position encoding function 502. The positional encoding function 502 processes the aggregate noise level 306 to generate a positional encoding of the noise level. For example, the aggregate noise level 306 can be multiplied by a positional encoding function 502 that is a combination of sine function for even dimension indices and a cosine function for odd dimension indices, as in pre-processing for a transformer model.

The right branch of the residual connection layer 508 includes a convolutional layer 504 and an activation layer 506. The convolutional layer 504 processes the alternative representation 402 to generate an input to the activation layer 506. The activation layer 506 processes the output from the convolutional layer 504 to generate an input to the residual connection layer 508. For example, the convolutional layer 504 can include filters of size 3×1 with stride one (to maintain dimensionality), and the activation layer 506 can be a fully-connected layer with a leaky ReLU activation function.

The residual connection layer 508 can combine the output from the left branch (e.g., the output from the positional encoding function 502) and the output from the right branch (e.g., the output from the activation layer 506) to generate an input to both a convolutional layer 510 and a convolutional layer 514. For example, the residual connection layer 508 can add (e.g., elementwise addition) the output from the left branch and the output from the right branch to generate the input to the two convolutional layers (e.g., 510 and 514).

The convolutional layer 510 processes the output from the residual connection layer 508 to generate the scale vector 512. For example, the convolutional layer 510 can include filters of size 3×1 with stride one (to maintain dimensionality).

The convolutional layer 514 processes the output from the residual connection layer 508 to generate the bias vector 516. For example, the convolutional layer 514 can include filters of size 3×1 with stride one (to maintain dimensionality).

Figure 6:
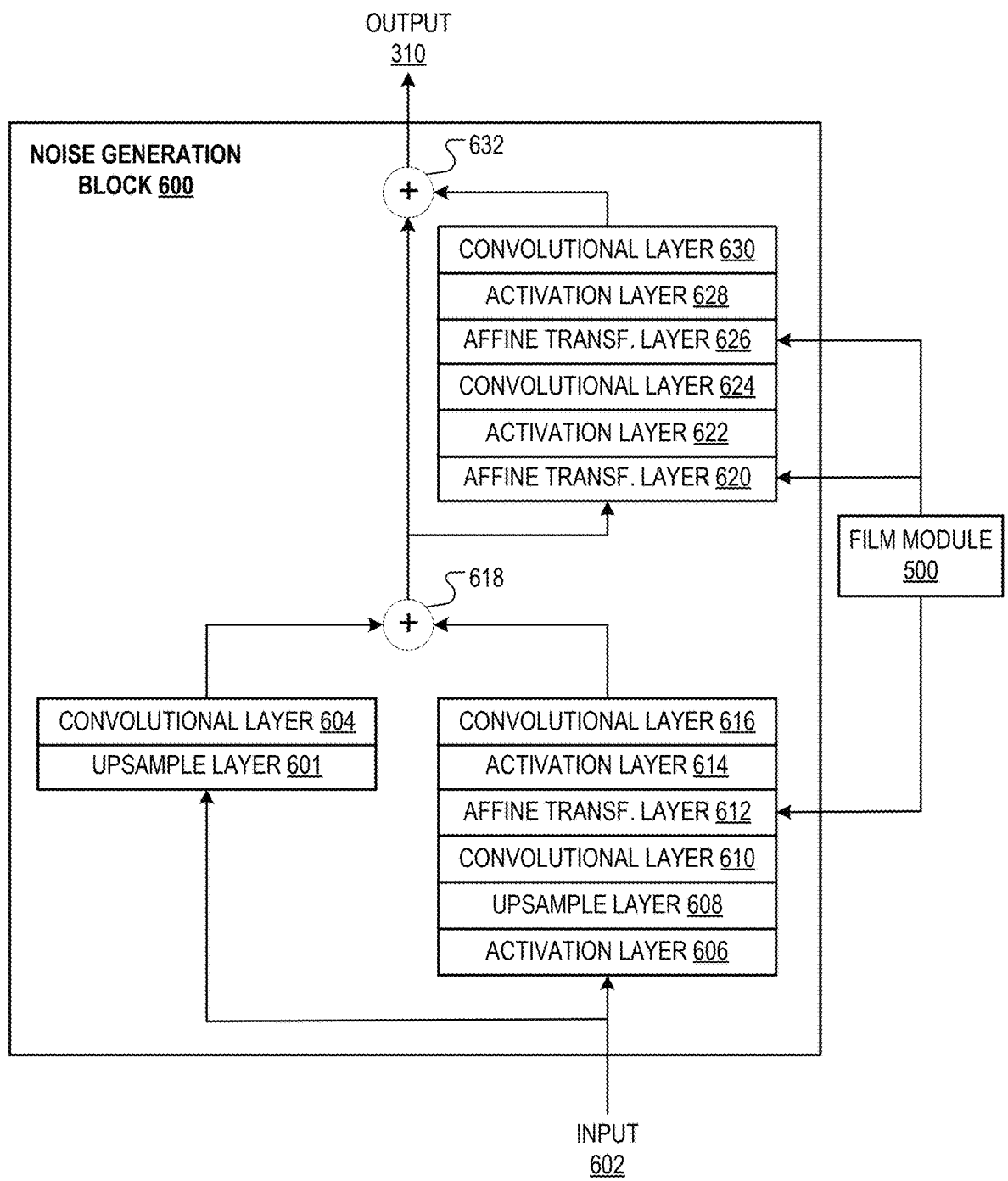
FIG. 6 is a block diagram of an example noise generation neural network block.

FIG. 6 shows an example architecture of the noise generation block 600.

The noise generation block 600 processes an input 602 and an output from a FiLM module 500 to generate an output 310. The input 602 can be a phoneme sequence processed by one or more previous neural network layers (e.g., from the noise generation blocks 338, 336, 334, 332, and convolutional layer 302 of FIG. 3). The output 310 can be an input to a subsequent convolutional layer which will process the output 310 to generate the noise output 118 (e.g., the convolutional layer 304 of FIG. 3). The noise generation block 600 includes one or more neural network layers. The one or more neural network layers can include multiple types of neural network layers, including activation layers with non-linear activation functions (e.g., fully-connected layers with leaky ReLU activation functions), upsample layers (e.g., which "upsample" or increase the dimensionality of the input), convolutional layers, affine transformation layers, and residual connection layers.

For example, an upsample layer can be a neural network layer which "upsamples" (that is, increases) the dimensionality of an input. That is, an upsample layer generates an output that has a higher dimensionality than the input to the layer. In a particular example, the upsample layer can generate an output with X copies of each value in the input to increase the dimensionality of the output compared with the input by a factor of X (e.g., for an input (2,7,−4), generate an output with two copies of each value as (2,2,7, 7,−4,−4), or five copies of each value as (2,2,2,2,2,7,7,7,7, 7,−4,−4,−4,−4,−4), etc.). Generally, the upsample layer can fill each extra spot in the output with the nearest value in the input.

The left branch of a residual connection layer 618 includes an upsample layer 601 and a convolutional layer 604. The upsample layer 601 processes the input 602 to generate an input to the convolutional layer 604. The input to the convolutional layer has a higher dimensionality than the input 602. The convolutional layer 604 processes the output from the upsample layer 601 to generate an input to the residual connection layer 618. For example, the upsample layer can increase the dimensionality of the input by a factor of two by generating an output with two copies of each value in the input 602. The convolutional layer 604 can include filters with dimensions 3×1 and stride one (e.g., to maintain dimensionality).

The right branch of the residual connection layer 618 includes an activation layer 606 (e.g., a fully-connected layer with a leaky ReLU activation function), an upsample layer 608, a convolutional layer 610 (e.g., with a 3×1 filter size and stride one), an affine transformation layer 612, an activation layer 614 (e.g., a fully-connected layer with a leaky ReLU activation function), and a convolutional layer 616 (e.g., with a 3×1 filter size and stride one), in that order.

The activation layer 606 processes the input 602 to generate an input to the upsample layer 608. The upsample layer increases the dimensionality of the output from the activation layer 606 to generate an input to the convolutional layer 610 with a higher dimensionality than the input 602 (e.g., by a factor of two to match upsample layer 601). The convolutional layer 610 processes the output from upsample layer 608 to generate an input to the affine transformation layer 612 (e.g., with filters of dimensions 3×1 and stride one to maintain dimensionality). The activation layer 614 and convolutional layer 616 further process the output from affine transformation layer 612 to generate an input to the residual connection layer 618 (e.g., with a leaky ReLU function for network 614 and filters of dimensions 3×1 and stride one for network 616).

For example, an affine transformation function can process the output from a preceding neural network layer (e.g., the convolutional layer 610 in the noise generation block 600) and the output from a FiLM module to generate an output. For example, the FiLM module can generate a scale vector and a bias vector. The affine transformation layer can add the bias vector to the result of scaling (e.g., using a Hadamard product, or elementwise multiplication) the output from the previous neural network layer using the scale vector from the FiLM module.

The affine transformation layer 612 can process the output from convolutional layer 610 and the output from FiLM module 500 to generate the input to the activation layer 614. For example, by adding the bias vector from FiLM module 500 to the result of scaling the output from convolutional layer 610 with the scale vector from FiLM module 500.

The residual connection layer 618 combines the output from the left branch (e.g., the output from the convolutional layer 604) and the output from the right branch (e.g., the output from convolutional layer 616) to generate an output. For example, the residual connection layer 618 can sum the output from the left branch and the output from the right branch to generate the output.

The left branch of a residual connection layer 632 includes the output from the residual connection layer 618. The left branch can be interpreted as an identity function of the output from the residual connection layer 618.

The right branch of the residual connection layer 632 includes two sequential blocks of an affine transformation layer, an activation layer, and a convolutional layer, in that order, to process the output from residual connection layer 618 and to generate an input to residual connection layer 632. In particular, the first block contains affine transformation layer 620, activation layer 622, and convolutional layer 624. The second block contains affine transformation layer 626, activation layer 628, and convolutional layer 630.

For example, for each block, the respective affine transformation layer can process the output from the FiLM module 500 and the output from the respective previous neural network layer (e.g., affine transformation layer 620 can process the output from residual connection layer 618, and affine transformation layer 626 can process the output from the convolutional layer 624) to generate a respective output. Each affine transformation layer can generate the respective output by scaling the output from the previous neural network layer with the scale vector from the FiLM module 500 and summing the result of the scaling with the bias vector from the FiLM module 500. Each activation layer (e.g., 620 and 628) can be a respective fully-connected layer with a leaky ReLU activation function. Each convolutional layer can include respective filters of dimensions 3×1 and stride one (e.g., to maintain dimensionality).

The residual connection layer 632 combines the output from the left branch (e.g., the identity of the output from residual connection layer 618) and the output from the right branch (e.g., the output from the convolutional layer 630) to generate the output 310. For example, the residual connection layer 632 can sum the output from the left branch and the output from the right branch to generate output 310. The output 310 can be an input to a convolutional layer (e.g., the convolutional layer 304 of FIG. 3) which will generate the noise output 118.

The noise generation block 600 can include multiple channels. Each noise generation block in FIG. 3 (e.g., 600, 338, 336, 334, and 332) can include respective numbers of channels. For example, the noise generation blocks 600, 338, 336, 334, and 332 can include 128, 128, 256, 512, and 512 channels, respectively.

Figure 7:
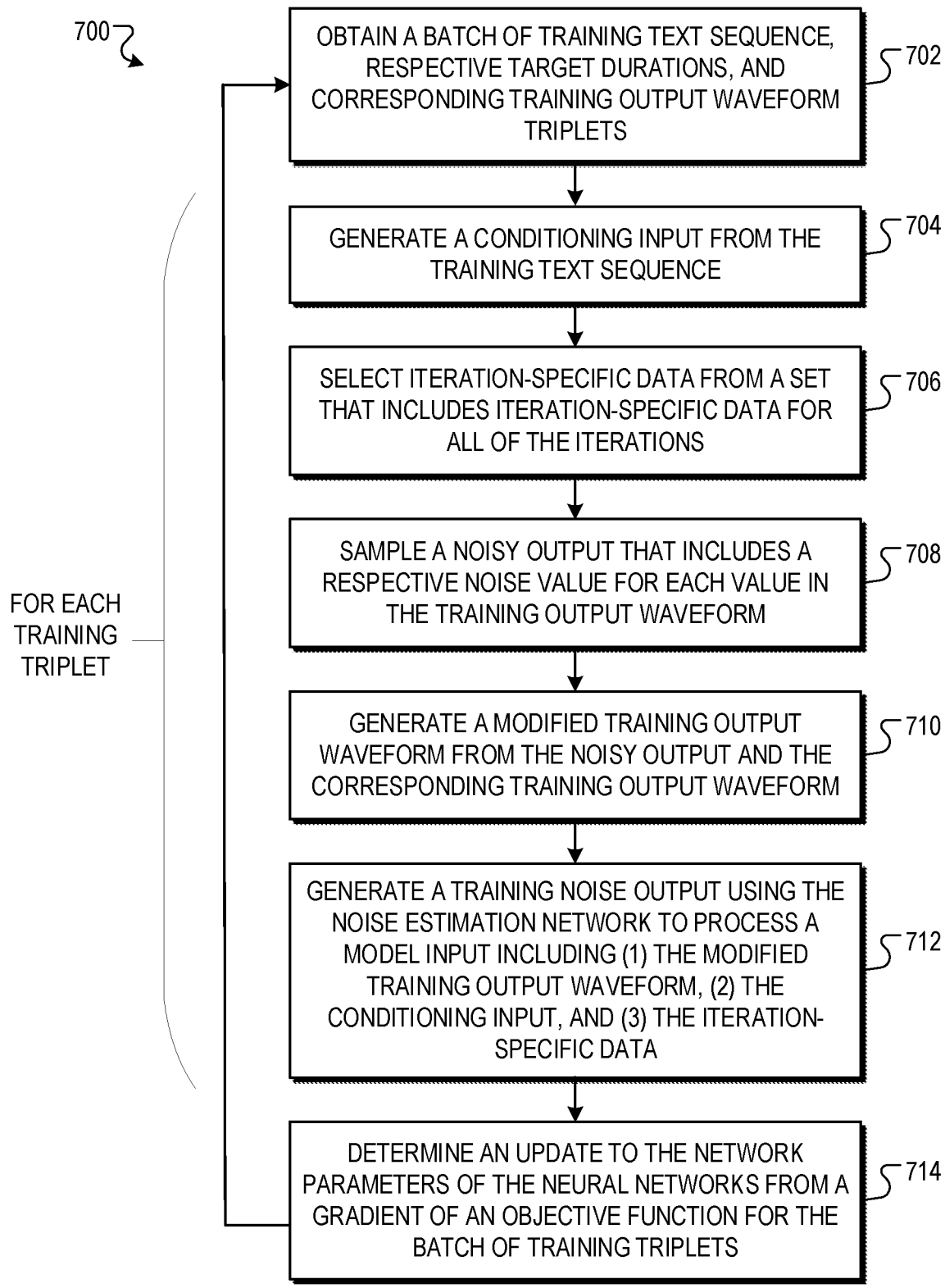
FIG. 7 is a flow diagram of an example process for training an end-to-end waveform system.

FIG. 7 is a flow diagram of an example process for training an end-to-end waveform system. For convenience, the process 700 will be described as being performed by a system of one or more computers located in one or more locations.

The system can perform the process 700 at each of multiple training iterations to repeatedly update the values of the parameters of the neural networks in the end-to-end-waveform system.

The system obtains a batch of training text sequence, respective target durations, and corresponding training output waveform triplets (702). For example, the system can randomly sample a training triplet from a data store. The training output waveform can represent an utterance (e.g., a recording of a speaker) of the training text sequence (e.g., represented by a phoneme sequence generated from the text or linguistic features of the text). The respective target durations can represent a set of ground-truth durations that should be predicted by the duration predictor neural network from the text sequence.

For each training triplet in the batch, the system generates a conditioning input from the training text sequence (704). The system can generate the conditioning input from the training text sequence in the same manner as steps (204)-(206) from FIG. 2. For example, the system can generate a hidden representation (e.g., including a respective hidden vector for each of multiple hidden time steps) of the text sequence using an encoder neural network. Then, the system can generate a respective predicted duration for each hidden time step in the hidden representation using a duration predictor neural network. These predicted durations can be used for a duration loss term that measures an error between the predicted durations and the target durations for the hidden time steps in the hidden representation of the text sequence (e.g., an L2 loss term that includes a sum of the squared error between the corresponding predicted duration and target duration pairs for the text sequence). The predictor neural network can be trained using a gradient of a loss function including at least the duration prediction loss term (e.g., a linear combination of the loss function from step (714) and the duration prediction loss) and an appropriate optimization method (e.g., such as ADAM).

The system can upsample (that is, increase the dimensionality of) the hidden representation to generate the conditioning input using the target durations (e.g., using an influence range neural network and Gaussian upsampling, as discussed in FIG. 2).

For each training triplet in the batch, the system selects iteration-specific data from a set that includes iteration-specific data for all of the iterations (706). For example, the system can sample a particular iteration from a discrete uniform distribution including integers one through the final iteration, then select the iteration-specific data based on the particular iteration sampled from the distribution. The iteration-specific data can include a noise level, an aggregate noise level, (e.g., as determined in equation (2)), or the iteration number itself. Thus the system can condition a noise estimation neural network on a discrete index, or can condition the noise estimation neural network on a continuous scalar indicating a noise level. Conditioning on a continuous scalar indicating a noise level can be advantageous, as once the noise estimation neural network is trained, a different number of refinement steps (i.e. iterations) can be used when generating a final network output at inference.

For each training triplet in the batch, the system samples a noisy output that includes a respective noise value for each value in the training output waveform (708). For example, the system can sample the noisy output from a noise distribution. In a particular example, the noise distribution can be a Gaussian noise distribution (e.g., such as N(0, I), where I is an identity matrix with dimensions n×n, and where n is the number values in the training output waveform).

For each training triplet in the batch, the system generates a modified training output waveform from the noisy output and the corresponding training output waveform (710). The system can combine the noisy output and the corresponding training output waveform to generate the modified training output waveform. For example, the system can generate the modified training output waveform as, $$y' = \sqrt{\bar{\alpha}}\, y_0 + \sqrt{1-\bar{\alpha}}\, \epsilon, \qquad (4)$$

where y' represents the modified training output waveform, $y_0$ represents the corresponding training output waveform, $\epsilon$ represents the noisy output, and $$\sqrt{\bar{\alpha}}$$

represents the iteration-specific data (e.g., an aggregate noise level).

For each training triplet in the batch, the system generates a training noise output by processing a model input including (1) the modified training output waveform, (2) the training text sequence, and (3) the iteration-specific data using the noise estimation neural network in accordance with current values of the noise estimation neural network parameters (712). The noise estimation neural network can process the model input to generate the training noise output as described in the process of FIG. 2. For example, the iteration-specific criteria can include the aggregate noise level $$\sqrt{\bar{\alpha}}.$$

The system determines an update to the network parameters of the noise estimation network, duration predictor network, and encoder network from a gradient of an objective function (714) for the batch of training triplets. The system can determine the gradient of the objective function with respect to the neural network parameters for each training triplet in the batch, and then update the current values of the neural network parameters with the gradients (e.g., a linear combination of the gradients, such as an average of the gradients) using any of a variety of appropriate optimization methods, such as stochastic gradient descent with momentum, or ADAM, to backpropagate the gradient through the neural networks.

The objective function can measure an error between the noisy output and the training noise output generated by the noise estimation network for each training triplet. For example, for a particular training triplet, the objective function can include a loss term which measures an L1 distance between the noisy output and the training noise output, as $$L(\epsilon, \epsilon_\theta) = \|\epsilon - \epsilon_\theta(y', x, \sqrt{\alpha})\|_1, \quad (5)$$

where $L(\epsilon, \epsilon_\theta)$ represents the loss function, $\epsilon$ represents the noisy output, $$\epsilon_\theta(y', x, \sqrt{\alpha})$$

represents the training noise output generated by the noise estimation neural network with parameters θ, y' represents the modified training output waveform, x represents the training text sequence, and $$\sqrt{\alpha}$$

represents the iteration-specific data (e.g., an aggregate noise level). To train the duration prediction neural network, the system can backpropagate the gradient of the loss function of equation (5), and combine the result with a gradient of the duration loss term described in step (704) as a linear combination.

The system can repeatedly perform steps (702)-(714) for multiple batches of training triplets (e.g., multiple training text sequence, respective target durations, and training output waveform triplets).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a phoneme sequence, the phoneme sequence comprising a respective phoneme token at each of a plurality of input time steps;
    processing the phoneme sequence using an encoder neural network to generate a hidden representation of the phoneme sequence;

generating, from the hidden representation, a conditioning input;

initializing a current waveform output; and generating a final waveform output that defines an utterance of the phoneme sequence by a speaker by updating the current waveform output at each of a plurality of iterations, wherein each iteration corresponds to a respective noise level, and wherein the updating comprises, at each iteration:

processing a model input for the iteration comprising (i) the current waveform output and (ii) the conditioning input using a noise estimation neural network that is configured to process the model input to generate a noise output, wherein the noise output comprises a respective noise estimate for each value in the current waveform output; and updating the current waveform output using the noise estimate and the noise level for the iteration.

2. The method of claim 1, wherein the noise estimation neural network and the encoder neural network have been trained end-to-end on training data that includes a plurality of training phoneme sequences and for each training phoneme sequence a respective ground truth waveform.

3. The method of claim 1, wherein updating the current waveform output using the noise estimate and the noise level for the iteration comprises:

generating an update for the iteration from at least the noise estimate and the noise level corresponding to the iteration; and subtracting the update from the current waveform output to generate an initial updated output waveform.

4. The method of claim 3, wherein updating the current waveform output further comprises:

modifying the initial updated output waveform based on the noise level for the iteration to generate a modified initial updated output waveform.

5. The method of claim 4, wherein, for the last iteration, the modified initial updated output waveform is the updated output waveform after the last iteration and, for each iteration prior to the last iteration, the updated output waveform after the last iteration is generated by adding noise to the modified initial updated output waveform.

6. The method of claim 1, wherein initializing the current waveform output comprises: sampling each of a plurality of initial values for the current waveform output from a corresponding noise distribution.

7. The method of claim 1, wherein the model input at each iteration includes iteration-specific data that is different for each iteration.

8. The method of claim 7, wherein the model input for each iteration includes the noise level corresponding to the iteration.

9. The method of claim 7, wherein the model input for each iteration includes an aggregate noise level for the iteration generated from the noise level corresponding to the iteration and noise levels corresponding to any iterations after the iteration in the plurality of iterations.

10. The method of claim 7, wherein the noise estimation neural network comprises:

a noise generation neural network comprising a plurality of noise generation neural network layers and configured to process the conditioning input to map the conditioning input to the noise output, and a output waveform processing neural network comprising a plurality of output waveform processing neural network layers configured to process the current waveform output to generate an alternative representation of the current waveform output, wherein:

at least one of the noise generation neural network layers receives an input that is derived from (i) an output of another one of the noise generation neural network layers, (ii) an output of a corresponding output waveform processing neural network layer, and (iii) the iteration-specific data for the iteration.

11. The method of claim 10, wherein the final output waveform has a higher dimensionality than the conditioning input, and wherein the alternative representation has a same dimensionality as the conditioning input.

12. The method of claim 10, wherein the noise estimation neural network comprises a respective Feature-wise Linear Modulation (FiLM) module corresponding to each of the at least one noise generation neural network layers, wherein the FiLM module corresponding to a given noise generation neural network layer is configured to process (i) the output of the other one of the noise generation neural network layers, (ii) the output of the corresponding output waveform processing neural network layer, and (iii) the iteration-specific data for the iteration to generate the input to the noise generation neural network layer.

13. The method of claim 12, wherein the FiLM module corresponding to the given noise generation neural network layer is configured to:

generate a scale vector and a bias vector from (ii) the output of the corresponding output waveform processing neural network layer, and (iii) the iteration-specific data for the iteration; and generate the input to the given noise generation neural network layer by applying an affine transformation to the output of (i) the other one of the noise generation neural network layers.

14. The method of claim 10, wherein the at least one of the noise generation neural network layers includes an activation function layer that applies a non-linear activation function to an input to the activation function layer.

15. The method of claim 14, wherein the other one of the noise generation neural network layers corresponding to the activation function layer is a residual connection layer or a convolutional layer.

16. The method of claim 1, wherein the hidden representation includes a respective hidden vector for each of a plurality of hidden time steps, and wherein generating, from the hidden representation, a conditioning input comprises:

processing the hidden representation using a duration predictor neural network to generate, for each hidden time step, a predicted duration in the utterance that is characterized by the hidden vector at the hidden time step; and generating the conditioning input by upsampling the hidden representation according to the predicted durations to match a time scale of the final waveform output.

17. The method of claim 16, wherein the conditioning input comprises a respective conditioning vector for each of a plurality of quantized time segments within the final waveform output.

18. The method of claim 16, further comprising:

generating, for each hidden time step, a predicted influence range in the utterance that is characterized by the hidden vector at the hidden time step, and wherein upsampling the hidden representation comprises applying Gaussian upsampling to the hidden representation using the predicted durations and the predicted influence ranges for the hidden time steps.

19. A system comprising one or more computers and one or more storage devices storing instructions that are operable, when executed by the one or more computers, to cause the one or more computers to perform operations comprising:
- obtaining a phoneme sequence, the phoneme sequence comprising a respective phoneme token at each of a plurality of input time steps;
- processing the phoneme sequence using an encoder neural network to generate a hidden representation of the phoneme sequence;
- generating, from the hidden representation, a conditioning input;
- initializing a current waveform output; and
- generating a final waveform output that defines an utterance of the phoneme sequence by a speaker by updating the current waveform output at each of a plurality of iterations, wherein each iteration corresponds to a respective noise level, and wherein the updating comprises, at each iteration:
  - processing a model input for the iteration comprising (i) the current waveform output and (ii) the conditioning input using a noise estimation neural network that is configured to process the model input to generate a noise output, wherein the noise output comprises a respective noise estimate for each value in the current waveform output; and
  - updating the current waveform output using the noise estimate and the noise level for the iteration.

20. One or more non-transitory computer-readable storage media encoded with instructions that, when executed by one or more computers, cause the one or more computers to perform operations comprising:
- obtaining a phoneme sequence, the phoneme sequence comprising a respective phoneme token at each of a plurality of input time steps;
- processing the phoneme sequence using an encoder neural network to generate a hidden representation of the phoneme sequence;
- generating, from the hidden representation, a conditioning input;
- initializing a current waveform output; and
- generating a final waveform output that defines an utterance of the phoneme sequence by a speaker by updating the current waveform output at each of a plurality of iterations, wherein each iteration corresponds to a respective noise level, and wherein the updating comprises, at each iteration:
  - processing a model input for the iteration comprising (i) the current waveform output and (ii) the conditioning input using a noise estimation neural network that is configured to process the model input to generate a noise output, wherein the noise output comprises a respective noise estimate for each value in the current waveform output; and
  - updating the current waveform output using the noise estimate and the noise level for the iteration.

21. The system of claim 19, wherein initializing the current waveform output comprises: sampling each of a plurality of initial values for the current waveform output from a corresponding noise distribution.

22. The system of claim 19, wherein the model input at each iteration includes iteration-specific data that is different for each iteration.

23. The system of claim 22, wherein the model input for each iteration includes the noise level corresponding to the iteration.

24. The system of claim 22, wherein the model input for each iteration includes an aggregate noise level for the iteration generated from the noise level corresponding to the iteration and noise levels corresponding to any iterations after the iteration in the plurality of iterations.

25. The system of claim 22, wherein the noise estimation neural network comprises:
- a noise generation neural network comprising a plurality of noise generation neural network layers and configured to process the conditioning input to map the conditioning input to the noise output, and
- a output waveform processing neural network comprising a plurality of output waveform processing neural network layers configured to process the current waveform output to generate an alternative representation of the current waveform output, wherein:
  - at least one of the noise generation neural network layers receives an input that is derived from (i) an output of another one of the noise generation neural network layers, (ii) an output of a corresponding output waveform processing neural network layer, and (iii) the iteration-specific data for the iteration.

26. The system of claim 25, wherein the final output waveform has a higher dimensionality than the conditioning input, and wherein the alternative representation has a same dimensionality as the conditioning input.

27. The system of claim 25, wherein the noise estimation neural network comprises a respective Feature-wise Linear Modulation (FiLM) module corresponding to each of the at least one noise generation neural network layers, wherein the FiLM module corresponding to a given noise generation neural network layer is configured to process (i) the output of the other one of the noise generation neural network layers, (ii) the output of the corresponding output waveform processing neural network layer, and (iii) the iteration-specific data for the iteration to generate the input to the noise generation neural network layer.

* * * * *